United States Patent [19]

Block et al.

[11] Patent Number: 5,402,864
[45] Date of Patent: Apr. 4, 1995

[54] CASTOR BRAKE ASSEMBLY

[75] Inventors: Vurl D. Block, Waldenburg; Robert K. Hamilton, Jonesboro, both of Ark.

[73] Assignee: Colson Caster Corporation, Jonesboro, Ark.

[21] Appl. No.: 269,285

[22] Filed: Jun. 29, 1994

[51] Int. Cl.$^6$ .............................................. B62B 5/04
[52] U.S. Cl. .................................. 188/19; 188/72.7
[58] Field of Search ................. 188/1.12, 19, 29, 17, 188/21, 20, 26, 30, 31, 69, 71.1, 72.1, 72.7, 72.8, 72.9

[56] References Cited

U.S. PATENT DOCUMENTS

| | | | |
|---|---|---|---|
| 918,636 | 4/1909 | Young | 188/1.12 X |
| 3,467,981 | 9/1969 | Peter | 188/1.12 X |
| 3,985,208 | 10/1976 | Libhart | 188/1.12 |

*Primary Examiner*—Robert J. Oberleitner
*Assistant Examiner*—Peter M. Poon
*Attorney, Agent, or Firm*—Jon Carl Gealow

[57] ABSTRACT

A castor braking mechanism for use on a castor having a wheel, the hub of which wheel is mounted on an axle between a pair of legs. The braking mechanism includes a cam member mounted between one side of the wheel hub and a leg, and a cam engaging member located on the outside of the same leg. The axle passes through hole in both members. Retaining members at each end of the axle are spaced apart, such that when the cam member and the cam engaging member are in a first position with respect to each other the wheel is free to rotate, and when the cam engaging member is rotated in either direction with respect to the cam member, they are forced apart from each other so as to apply an axial force between the retaining means to the hub of the wheel to impede or prevent rotation of the wheel.

20 Claims, 1 Drawing Sheet

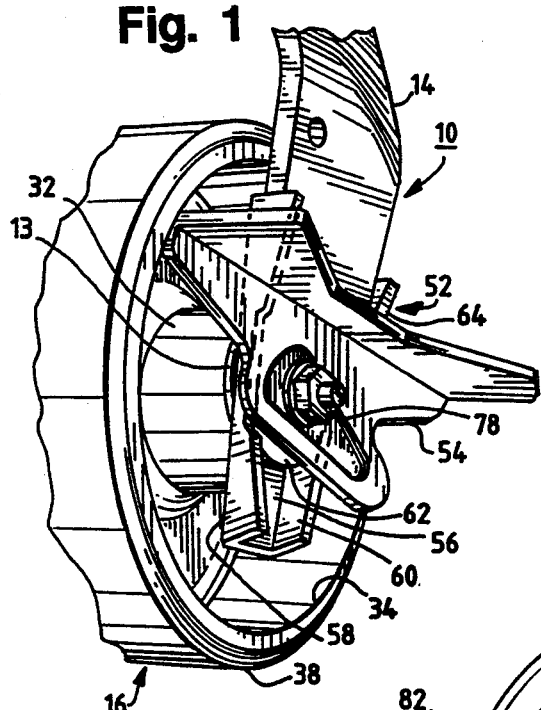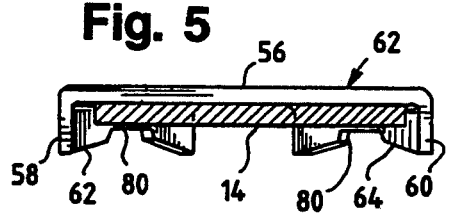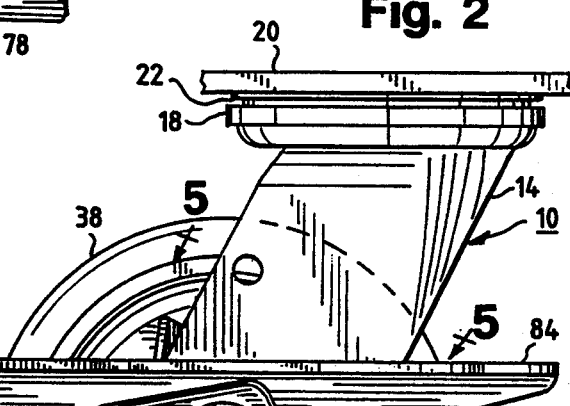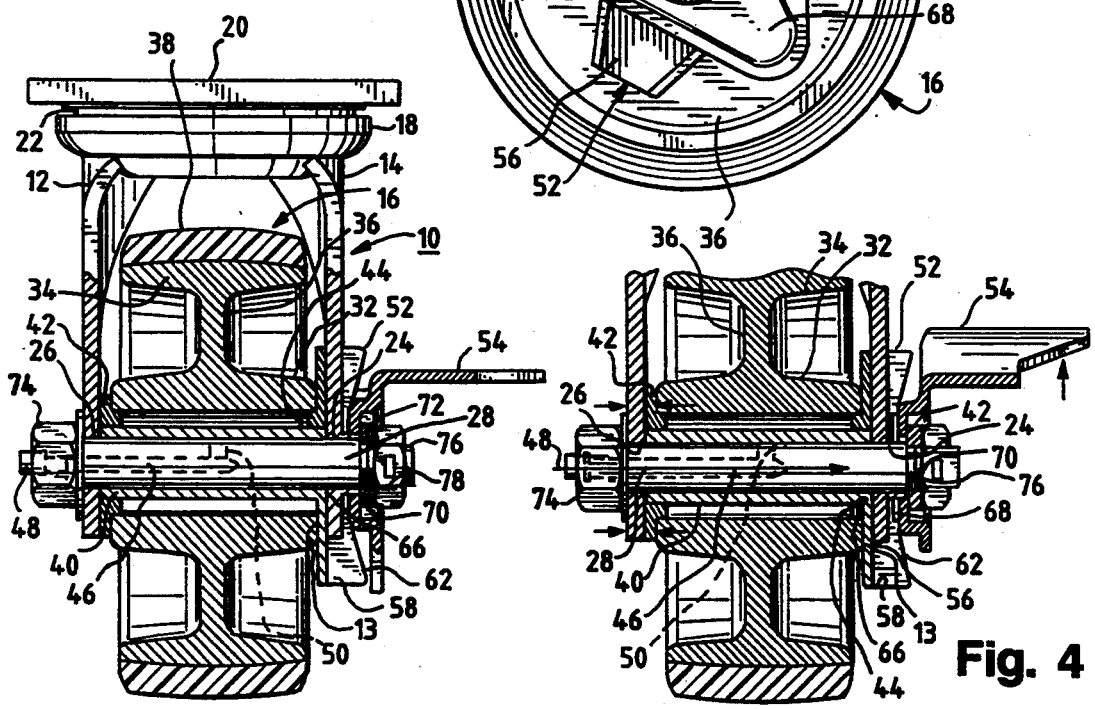

CASTOR BRAKE ASSEMBLY

BACKGROUND OF THE INVENTION

I. Field of the Invention

Manually operated brake mechanisms for impeding and preventing the turning of a castor wheel.

II. Description of Related Art Including Information Disclosed Under 37 CFR Secs. 1.97 & 1.98

Brake mechanisms of various types have been provided in the past for impeding and locking castor wheels against rotation. For instance, when hoppers or carts of various configurations are provided with castors, it is desirable to prevent rotation of the castor wheels once the hopper or cart is placed in a desired location. Otherwise, there is the possibility that the hopper or cart will roll away from the desired location due to gravitational forces or due to being accidentally bumped.

U.S. Pat. No. 3,985,208 granted to Anthony C. Libhart and assigned to The Colson Company, a predecessor of the assignee of this application, reveals a castor brake having an operating member which engages a cam member having opposed oppositely inclined cam surfaces defined by side flanges when it is rotated to provide braking action. Rotation of the operating member in a first direction applies a pressure on the hub of the castor wheel to create a frictional force which impedes rotation of the wheel. Rotation of the operating member in the direction opposite the first releases the pressure on the hub to permit the castor wheel to turn freely.

SUMMARY OF THE INVENTION

It is an object of this invention to provide a castor wheel braking or locking mechanism which includes an operating member, pivotal in either direction about the wheel axle from an unlocked position to lock the wheel. It is a further object of this invention to provide a castor wheel locking mechanism which has well defined and readily observable locked and unlocked positions. It is a still further object of this invention to provide a castor wheel locking mechanism which requires a minimum number of parts, is simple and economical to manufacture and assemble and is extremely simple in operation while yet providing enhanced wheel locking performance.

The wheel locking mechanism of this invention is particularly adapted for use in a castor assembly wherein an axle passes through support legs on opposite sides of a castor wheel and through a central bore of the hub of the castor. In accordance with this invention, the wheel locking mechanism includes two principal components, a cam member and an operating member, both of which are provided with apertures through which the axle passes. The cam member has a flat pressure surface portion which is located between the hub of the wheel and one of the legs. Projecting edges are bent outwardly from the pressure surface such that they surround the edges of the legs and project outwardly therefrom. Cam surfaces provided on the projecting edges project the least adjacent the axle and increase in projecting distance the greater the distance from the axle. The operating member is formed as an L-shaped member, the first leg of which has an embossed cam engaging portion which when assembled on the axle projects toward the cam surfaces of the cam member. The second leg projects outwardly from the leg of the castor and provides an actuating surface to which an actuating force may be applied. The hole for receiving the axle is provided in the embossed portion. In a preferred embodiment, when the actuating surface is horizontal, portions of the embossed portion rest in the least projecting portion of the cam surface, located adjacent the axle, such that the brake mechanism is in the unlocked condition. Rotation of the operating member in either direction about the axle, clockwise or counter clockwise, results in the embossed cam engaging portion engaging each of the cam surfaces, so as to apply an inward pressure on the cam member. The cam member, in turn, engages the hub of the wheel to apply a pressure thereto to resist rotation of the wheel.

BRIEF DESCRIPTION OF THE DRAWINGS

FIG. 1 is a perspective view of the brake locking mechanism of this invention installed on a typical castor.

FIG. 2 is a side elevation view of the castor and brake assembly of this invention as shown in FIG. 1.

FIG. 3 is a front elevation view of the castor and brake assembly of this invention as shown in FIG. 1.

FIG. 4 is a partial sectional view similar to that shown in FIG. 3 showing the brake mechanism of this invention in the engaged position.

FIG. 5 is a cross-sectional view taken along the line 5—5 in FIG. 2.

DETAILED DESCRIPTION OF THE PREFERRED EMBODIMENT

Referring to the figures, and most particularly to FIGS. 1-3, a castor assembly 10 includes a pair of legs 12 and 14 from which is supported by a castor wheel 16. The legs extend from a rotatable member 18 which is rotatably supported from a mounting plate 20. The rotatable member 18 is secured by means of a rivet or bolt (not shown) to the mounting plate 20 with a bearing means such as ball bearing ring 22 therebetween. The rotatable member 18 may be rotated with respect to the mounting plate 20, with the rivet or bolt being the axis of rotation. A pair of apertures 24 and 26 are formed in the legs 12 and 14 for receiving an axle or bolt 28 for supporting the wheel 16 from the legs. The wheel 16 is formed with a ridged support member having an inner hub 32 and an outer rim 34 supported from the hub by an annular web 36. A tread or tire 38 is secured over the rim 34. A cylindrical sleeve 40 is received over the outer diameter of the bolt 28. The central bore of the hub 32 is supported on the sleeve 40 by a stepped cylindrical spacer 42 on the left side as viewed in FIG. 3 and a cylindrical spacer 44 on the right side. For the purpose of lubricating the castor, a bore 46 is provided in the axle 28. The bore 46 is closed at the left end by a grease zerk 48, and has a radially extending open end 50 at the center of the axle. The castor assembly so far described is generally in accordance with the prior art.

The braking mechanism in accordance with this invention includes a cam member 52 and an operating member 54. The cam member 52 as shown in the figures is formed with a flat base or pressure surface 56, opposite edges of which are bent at essentially right angles to form outwardly projecting members 58 and 60. The outer edges of the members 58 and 60 form caming surfaces 62 and 64. As best seen in FIGS. 1, 3 and 4, the caming surface 62 and 64 each have the shape of a generally widespread V being of least height closest at the center and increasing in height toward both ends of the members. The base 56 of the cam member 52 is provided with a hole 66 to receive axle 28, and is shaped to receive the leg 14 between the outwardly projecting members 58 and 60. The base 56 is interposed between the end of the hub 13 of the wheel 16 and the inside surface of the leg 14.

The operating member 54 is formed with two portions at essentially right angles to each other. A first portion includes a triangularly shaped embossed cam engaging portion 68. An aperture 70 is provided in the embossed cam engaging portion 68 to receive the axle or shaft 28, with enough clearance to also receive an inwardly projecting sleeve extending from a washer 72.

The axle 28 is shown as a bolt having a head 74 at the left end as viewed in FIG. 3 and a threaded portion 76 at the right end. A locking nut 78 is threaded onto the threaded portion 76 and a predetermined torque applied thereto such that as will hereinafter be explained, with the operating member 54 in the unlocked position as shown in FIG. 3, the wheel will freely turn, but when the operating member is rotated to a locked position such as shown in FIG. 4, forces will be applied to the edges of the hub as shown in FIG. 4 to impede or prevent rotation of the wheel.

Referring to FIG. 5, it will be noted that the widespread V-shaped caming surfaces 62 and 64 of the outwardly projecting members 58 and 60 are each provided with a recessed portion 80 at the center. The embossed cam engaging portion 68 of the operating member 54 is located in the recessed portions 80 when the brake is in the unlocked position as shown in FIGS. 2 and 3. When the operating member 54 is pivoted clockwise or counter clockwise from the position shown in FIG. 2, the cam engaging portion 68 on each side of the axle 28 engage the cam surfaces on the outwardly projecting members 58 and 60 to develop the axially directed forces as shown in FIG. 4. When the operating member is rotated in the counter clockwise direction as viewed in FIG. 2, the cam engaging portion 68 will engage the lower portion of the caming surface 62 and the upper portion of the caming surface 64.

It can thus be understood that with the wheel locking mechanism of this invention, the operating member 54 can be rotated either clockwise or counterclockwise, such as by stepping on surface 82 or 84 as shown in FIG. 2, to bring about engagement of the locking mechanism to impede or prevent turning of the wheel 16. To disengage the brake, it is only necessary to apply a force to the upwardly projecting one of the surfaces 82 or 84 to return operating member 54 to its horizontal position.

In summary, using the brake mechanism of this invention, braking action is initiated by applying a force to either surface 82 or 84, whichever may be most accessible due to the position of the castor with respect to the body which it is supporting. Further, the unlocked position of the brake mechanism is easily determined by returning of the operating member 48 to the horizontal position.

While one embodiment of the invention has been shown, it should be apparent to those skilled in the art that what has been described is considered at the present to be the preferred embodiment of the braking mechanism of this invention. In accordance with the patent statutes, changes may be made in the braking mechanism without actually departing from the true spirit and scope of this invention. The appended claims are intended to cover all such changes and modifications which fall within the true spirit and scope of this invention.

What is claimed is:

1. A braking mechanism for use with a castor assembly having a pair of legs extending on opposite sides of a wheel which is received on an axle supported by the legs, the braking mechanism comprising:

A. a cam member having a U-shaped cross-section, said cam member having a base and a pair of side members extending from said base so as to form cam surfaces, the height of said side members being the least at the center and increasing toward their ends so as to form generally V-shaped cam surfaces, said base being provided at its center with a hole for receiving the axle, the width of said base being at least as large as the width of said legs, such that said leg may rest on said base between said side members.

B. a cam engaging member having first and second portions, said first portion having a hole therein for receiving the axle, and a projecting portion formed therein surround said hole, said second portion being engageable by a force for actuating said brake between engaged and disengaged positions, C. retaining means at each end of said axle to retain said axle and wheel between said legs, said cam engaging member and said cam member being secured by said retaining means on opposite sides of one of the legs, with said projecting portion positioned to be engageable with said cam surfaces, whereby when said projecting portion is in a first position over the center of the said V-shaped cam surfaces, the wheel is free to rotate, and when said cam engaging member is rotated from said first position, said projecting portion engages higher portions of said V-shaped cam surfaces, thereby applying a compressive force to the sides of said wheel to impede or prevent its rotation.

2. The braking mechanism for use with a castor of claim 1 wherein said cam member is formed with a trapezoidal shaped base to conform to a tapered shape of the leg.

3. The braking mechanism for use with a castor of claim 1 wherein at least one end of said axle is threaded, and said retaining means at said one end of said axle is a nut, such that the spacing between said retaining means may be adjusted.

4. The braking mechanism for use with a castor of claim 1 wherein said cam engaging member is formed from a flat metal member, with said projecting portion being formed as an embossment in said first portion.

5. The braking mechanism for use with a castor of claim 4 wherein the embossment has a triangular shape, with said hole being located near the center of the triangular shape.

6. The braking mechanism for use with a castor of claim 4 wherein said second portion of said cam engaging member is formed at right angles to said first portion so as to provide an actuating surface against which a force may be applied to rotate said cam engaging member.

7. The braking mechanism for use with a castor of claim 4 wherein said base and said side members of said cam member are formed with said V-shaped cam surfaces in alignment, such that when said projecting portion is positioned in the center of said V-shaped cam surfaces, said actuating surface is horizontally oriented.

8. The braking mechanism for use with a castor of claim 1 wherein rotation of said cam engaging member from said first position causes said projecting portion to engage said cam surfaces on each of said side members, such that said axial force is applied at radially opposite sides of said axle to the hub of the wheel.

9. The braking mechanism for use with a castor of claim 1 wherein when said cam engaging member is rotated in a first direction from said first position, said projecting portion engages said cam surfaces to apply an increasing axial force to the ends of said hub to brake rotation of said wheel, and when thereafter rotated in the opposite direction to said first position, said axial force is released to permit said wheel to freely turn.

10. The braking mechanism for use with a castor of claim 1 wherein said cam engaging member may be rotated clockwise or counterclockwise from said first position to cause said projecting portion to engage said cam surfaces to apply an increasing axial force to the ends of said hub to brake rotation of said wheel, and when said cam engaging member is thereafter rotated in the opposite direction to said first position, said axial force is released to permit said wheel to freely turn.

11. A braking mechanism for use with a castor having a wheel, the hub of which has a central bore which receives an axle supported in aligned holes in legs which extend on opposite sides of the wheel and are spaced apart from each other so as to receive the hub of the wheel therebetween, the braking mechanism comprising,
 A. A cam member having a U-shaped cross-section, said cam member having an elongated base and a pair of generally parallel elongated side members extending in the same direction from said base, said side members extending further from said base at the ends than at the center so as to form a general V-shaped cam surface, said base being provided at its center with a hole for receiving the axle, the width of said base being adapted, such that said leg may rest on said base between said side members,
 B. A cam engaging member having first and second portions, said first portion having a hole therein for receiving said axle, and having a cam engaging segment formed adjacent said hole, said cam engaging segment positioned to engage said generally V-shaped cam surfaces, said second portion being engageable by a force for actuating said brake between engaged and disengaged positions,
 C. retaining means at each end of said axle, said retaining means being spaced apart a predetermined distance, such that when said cam engaging member is in a first position wherein said cam engaging segment is located at the center of said V-shaped cam surface, the wheel is free to rotate, and when said cam engaging segment is rotated from said first position, said cam engaging segment engages said cam surface farther away from the center of said V-shaped cam surface to apply an increasing axial force to the ends of said hub to impede or prevent rotation of said wheel.

12. The braking mechanism for use with a castor of claim 11 wherein said cam member is formed with a trapezoidal shaped base to conform to a tapered shape of the leg.

13. The braking mechanism for use with a castor of claim 11 wherein at least one end of said axle is threaded, and said retaining means at said one end of said axle is a nut, such that the spacing between said retaining means may be adjusted.

14. The braking mechanism for use with a castor of claim 11 wherein said cam engaging member is formed from a flat metal member, with said cam engaging segment being formed as an embossment in said first portion.

15. The braking mechanism for use with a castor of claim 14 wherein the embossment has a triangular shape, with said hole being located near the center of the triangular shape.

16. The braking mechanism for use with a castor of claim 14 wherein said second portion of said cam engaging member is formed at right angles to said first portion so as to provide an actuating surface against which a force may be applied to rotate said cam engaging member.

17. The braking mechanism for use with a castor of claim 16 wherein said base and said side members of said cam member are formed with said V-shaped cam surfaces in alignment, such that when said cam engaging segment is positioned in the center of said V-shaped cam surfaces, said actuating surface is horizontally oriented.

18. The braking mechanism for use with a castor of claim 11 wherein rotation of said cam engaging member from said first position causes said cam engaging segment to engage said cam surfaces on each of said side members, such that said axial force is applied at radially opposite sides of said axle to the hub of the wheel.

19. The braking mechanism for use with a castor of claim 11 wherein when said cam engaging member is rotated in a first direction from said first position, said cam engaging segment engages said cam surface to apply an increasing axial force to the ends of said hub to brake rotation of said wheel, and when thereafter rotated in the opposite direction to said first position, said axial force is released to permit said wheel to freely turn.

20. The braking mechanism for use with a castor of claim 11 wherein said cam engaging member may be rotated clockwise or counterclockwise from said first position to cause said cam engaging segment to engage said cam surface to apply an increasing axial force to the ends of said hub to brake rotation of said wheel, and when said cam engaging member is thereafter rotated in the opposite direction to said first position, said axial force is released to permit said wheel to freely turn.

* * * * *